(12) United States Patent
Ohno

(10) Patent No.: US 10,514,074 B2
(45) Date of Patent: Dec. 24, 2019

(54) RAILWAY VEHICLE DISC BRAKE APPARATUS

(71) Applicant: NABTESCO CORPORATION, Tokyo (JP)

(72) Inventor: Tomoya Ohno, Kobe (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 14/833,814

(22) Filed: Aug. 24, 2015

(65) Prior Publication Data

US 2016/0061277 A1    Mar. 3, 2016

(30) Foreign Application Priority Data

Aug. 26, 2014  (JP) ................................. 2014-171557

(51) Int. Cl.
| | | |
|---|---|---|
| *F16D 55/224* | (2006.01) | |
| *B61H 5/00* | (2006.01) | |
| *F16D 55/00* | (2006.01) | |

(52) U.S. Cl.
CPC ........... *F16D 55/2245* (2013.01); *B61H 5/00* (2013.01); *F16D 2055/0008* (2013.01); *F16D 2055/0016* (2013.01)

(58) Field of Classification Search
CPC ......... F16D 55/2245; F16D 2055/0008; F16D 2055/0016; B61H 5/00
See application file for complete search history.

(56) References Cited

U.S. PATENT DOCUMENTS

| | | | | | |
|---|---|---|---|---|---|
| 2,258,570 | A | * | 10/1941 | Horger | ................... B61F 15/14 384/459 |
| 2,890,767 | A | * | 6/1959 | Tack | ........................ B61H 5/00 188/205 R |
| 4,374,552 | A | * | 2/1983 | Dayen | ................. F16D 55/2245 188/72.9 |
| 4,586,399 | A | * | 5/1986 | Kassai | ..................... B62B 7/08 24/541 |
| 5,058,712 | A | | 10/1991 | Noah | |

(Continued)

FOREIGN PATENT DOCUMENTS

| | | |
|---|---|---|
| CN | 101427043 A | 5/2009 |
| CN | 103958916 A | 7/2014 |

(Continued)

OTHER PUBLICATIONS

Office Action as issued in Taiwanese Patent Application No. 104127542, dated Jul. 27, 2016.

(Continued)

*Primary Examiner* — Melody M Burch
(74) *Attorney, Agent, or Firm* — Pillsbury Winthrop Shaw Pittman, LLP

(57) ABSTRACT

A vehicle disc brake apparatus is adapted for use with a vehicle including a brake disc and includes a bracket configured to be fixed to the vehicle, a caliper body coupled to the bracket and pivotal about a pivotal axis that extends in a front-rear direction of the vehicle, a brake cylinder device that generates braking force, and two levers arranged on the caliper body. The levers transmit the braking force to the brake disc of the vehicle. The bracket and the caliper body are coupled at a position located toward the brake disc from the brake cylinder device.

18 Claims, 8 Drawing Sheets

(56) References Cited

U.S. PATENT DOCUMENTS

| | | | | |
|---|---|---|---|---|
| 5,165,410 A | * | 11/1992 | Warne | A61B 6/00 250/363.04 |
| 2008/0000731 A1 | * | 1/2008 | Dewberry | F16D 55/2245 188/72.7 |
| 2009/0229930 A1 | | 9/2009 | Emilsson | |
| 2012/0111675 A1 | * | 5/2012 | Diemling | B61F 5/32 188/233.7 |
| 2014/0326547 A1 | | 11/2014 | Yano et al. | |

FOREIGN PATENT DOCUMENTS

| | | |
|---|---|---|
| FR | 1144539 A | 10/1957 |
| GB | 786090 A | 11/1957 |
| JP | 3-51524 A | 3/1991 |
| JP | 2009-68678 A | 4/2009 |
| JP | 2010-281458 A | 12/2010 |

OTHER PUBLICATIONS

Office Action Chinese Patent Application No. 201510527316.0 dated Jun. 13, 2017 with English translation.
Office Action dated Mar. 6, 2018 in corresponding French Patent Application No. 1557894.
Notification of Reasons for Refusal dated May 15, 2018 in corresponding Japanese Patent Application No. 2014-171557.

* cited by examiner

RAILWAY VEHICLE DISC BRAKE APPARATUS

CROSS-REFERENCE TO RELATED APPLICATIONS

This application is based upon and claims the benefit of priority from prior Japanese Patent Application No. 2014-171557, filed on Aug. 26, 2014, the entire contents of which are incorporated herein by reference.

FIELD

The present invention relates to a vehicle disc brake apparatus, particularly, a railway vehicle disc brake apparatus.

BACKGROUND

A conventional railway vehicle disc brake apparatus includes two caliper levers, each of which supports a brake pad. When the two caliper levers press the brake pads against two opposite sides of a wheel of the railway vehicle or against a brake disc rotating integrally with an axle, the disc brake apparatus generates braking force. Patent document 1 discloses a disc brake apparatus that includes a bracket, which is fixed to a railway vehicle, and a caliper body, which pivotally supports two caliper levers. The caliper body is coupled to the bracket and pivotal about a pivotal axis extending in a front-rear direction of the railway vehicle. In this structure, when the caliper levers press brake pads against a brake disc, which is movable in an axle direction while a wheel is rotating, the caliper levers pivot about the pivotal axis to follow the movement of the brake disc. This allows the brake pads of the caliper levers to come into proper planar contact with the brake disc. Thus, the disc brake apparatus may generate sufficient braking force.

PRIOR ART DOCUMENT

Patent Document

Patent Document 1: Japanese Laid-Open Patent Publication No. 2010-281458

SUMMARY

To increase the braking force of the vehicle disc brake apparatus, the diameter of the brake cylinder (fluid cylinder or spring brake cylinder) may be increased. However, the pivotal axis is arranged above the brake cylinder. Thus, the enlargement of the brake cylinder increases the height (size in vertical direction) of the vehicle disc brake apparatus. Thus, in relation to the position of the brake disc, the position where the vehicle disc brake apparatus is coupled to the vehicle body has to be changed to an upper position or the vehicle disc brake apparatus has to be coupled diagonally. The material of the pivot, which provides the pivotal axis, may be changed so that the diameter of the pivot is reduced. Additionally, in order to keep the vehicle disc brake apparatus at a low position, the material of the bracket, which is fixed to the railway chassis, may be changed to reduce the thickness of the bracket. However, there is a limit to such measures.

The same problem may occur when the lever ratio is decreased to shorten the vehicle disc brake apparatus in the front-rear direction of the vehicle while obtaining the necessary output of braking force.

It is an object of the present invention to provide a vehicle disc brake apparatus that is not increased in size in the vertical direction even when a brake cylinder has a large bore diameter.

(1) One aspect of the present invention is a vehicle disc brake apparatus adapted for use with a vehicle including a brake disc. The vehicle disc brake apparatus includes a bracket, a caliper body, a brake cylinder device, and two levers. The bracket is configured to be fixed to the vehicle. The caliper body is coupled to the bracket and pivotal about a pivotal axis that extends in a front-rear direction of the vehicle. The brake cylinder device generates braking force. The two levers are arranged on the caliper body and transmit the braking force to the brake disc of the vehicle. The bracket and the caliper body are coupled at a position located toward the brake disc (frontward) from the brake cylinder device.

In this structure, the coupling position of the bracket and the caliper body is located toward the brake disc from the brake cylinder device. Thus, the brake cylinder device may be located close to a vehicle floor as compared to a conventional structure (structure in which the pivotal axis is located at a position higher than the brake cylinder device). For example, as viewed in a vehicle front-rear direction, a viewed area of the brake cylinder device partially or entirely overlaps with the coupling position of the bracket and the caliper body. This prevents or minimizes increases in the height (size in the vertical direction) of the vehicle disc brake apparatus.

Therefore, in the above structure, even when the brake cylinder device has a large bore diameter, increases in the vertical size may be prevented or limited. Additionally, in relation to the position of the brake disc of the vehicle, there is no need to change the coupling position of the vehicle disc brake apparatus to the vehicle body or to couple the vehicle disc brake apparatus at an angle.

(2) Preferably, in the vehicle disc brake apparatus, the pivotal axis is arranged to overlap with the two levers as viewed in a widthwise direction of the vehicle. In this structure, as viewed in the vehicle widthwise direction, the pivotal axis would not project from above the levers. This ensures that the vehicle disc brake apparatus is reduced in height.

(3) Preferably, in the vehicle disc brake apparatus, the pivotal axis is configured so that as viewed in the vehicle widthwise direction, a center of gravity of the brake cylinder device in a vertical direction is located on a line that extends along the pivotal axis. In the prior art, the pivotal axis is separated upward from the center of gravity. More specifically, in the prior art, the center of gravity of the brake cylinder device, which is relatively heavy, is separated downward from the pivotal axis. Thus, when the vehicle sways, the caliper body excessively pivots. In this regard, in the above structure, the pivotal axis and the center of gravity of the brake cylinder device would not be greatly separated. This limits excessive pivoting of the caliper body. Here, the center of gravity refers to a concept including the point of the center of gravity and also points surrounding the point of the center of gravity. Thus, the center of gravity refers to a concept including points separated to an extent where pivoting of the caliper body would not be excessive when the vehicle sways.

(4) Preferably, in the vehicle disc brake apparatus, the caliper body is coupled so that the caliper body slides relative to the bracket. In this structure, there is no need for a pin that is long in the front-rear direction and conventionally used to pivot the caliper body relative to the bracket. Thus, the device may have a simple structure.

(5) Preferably, the vehicle disc brake apparatus further includes a pivot having a center axis that conforms to the pivotal axis. The pivot is fixed to one of the bracket and the caliper body. The other of the bracket and the caliper body includes a slot. The pivot includes a rod-like portion inserted into the slot. The rod-like portion slides and rotates relative to the slot. In this structure, the rod-like portion allows the caliper body to appropriately slide relative to the bracket.

(6) Further preferably, the vehicle disc brake apparatus further includes a plurality of seal members and a lubricant. The seal members are arranged on a slide portion.

The slide portion is located between the pivot and a sliding part of one of the bracket and the caliper body. The sliding part slides relative to the pivot. The lubricant is included in a gap formed by the seal members and the slide portion. In this structure, a lubricant such as grease or oil may decrease wear of the slide portion, which is located between the pivot and one of the bracket and the caliper body. Further, the lubricant is included in a gap formed by the seal members and the slide portion. This reduces the maintenance task such as that for periodically adding the lubricant to the gap.

(7) Preferably, in the vehicle disc brake apparatus, the bracket includes a fixing portion coupled to the vehicle and an extension including a basal portion fixed to the fixing portion. The extension extends away from the vehicle and includes a curved portion located toward the brake cylinder device. In this structure, the brake cylinder device may be located proximate to the bracket. Thus, the vehicle disc brake apparatus may have a compact structure.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DESCRIPTION OF THE EMBODIMENTS

One embodiment of a vehicle disc brake apparatus according to the present invention will now be described with reference to the drawings. In the embodiment, a vehicle may be a railway vehicle.

Entire Structure of Disc Brake Apparatus

Figure 1:
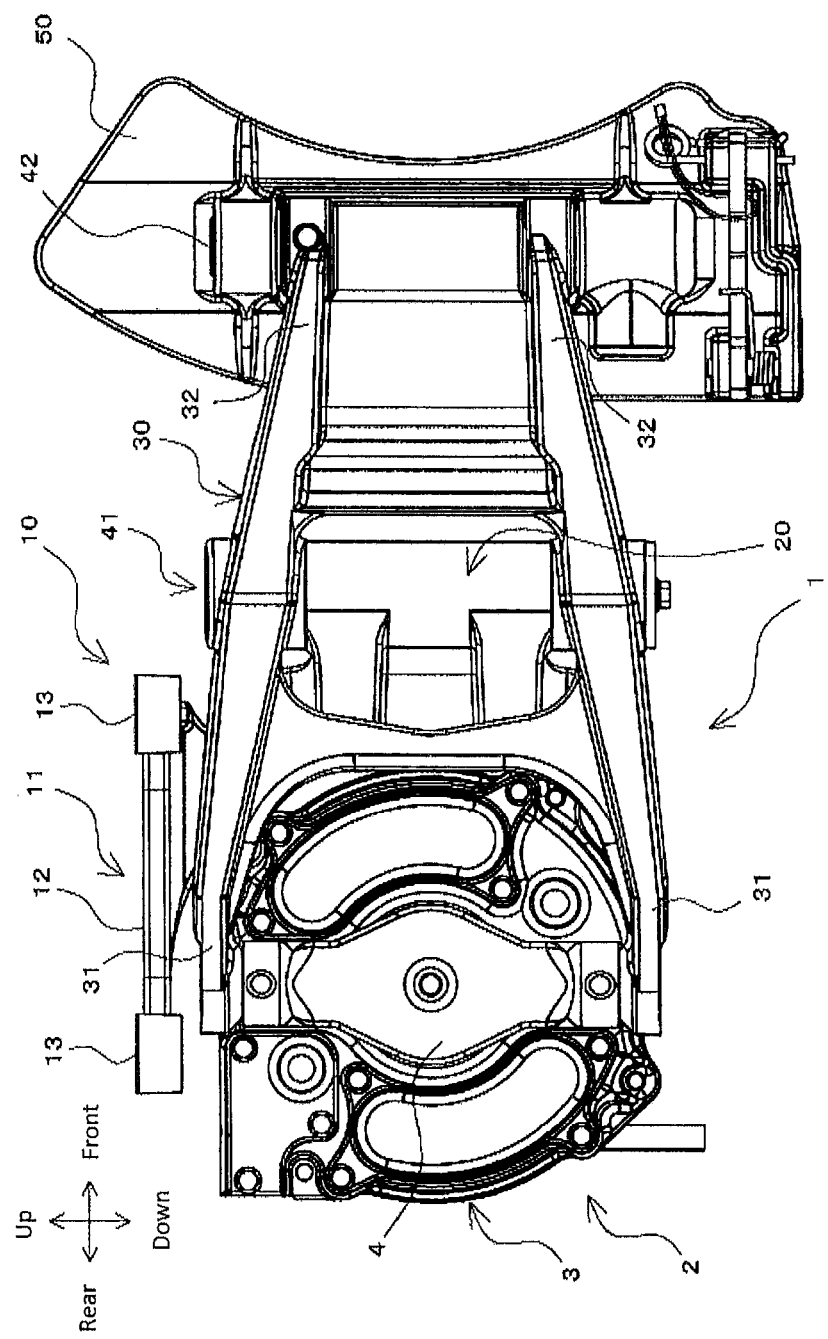
FIG. 1 is a side view showing one embodiment of a disc brake apparatus according to the present invention.
Figure 2:
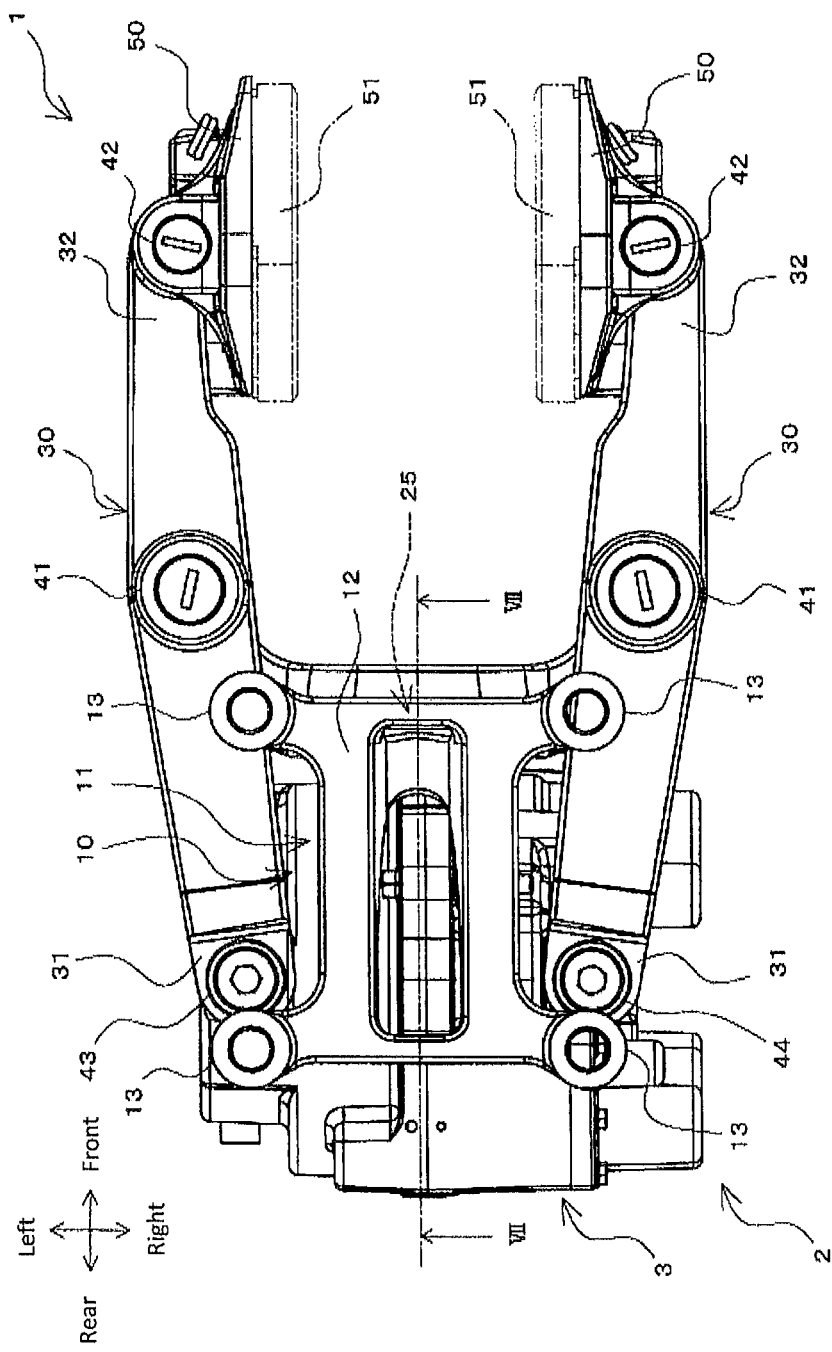
FIG. 2 is an upper view showing the disc brake apparatus of FIG. 1.
Figure 3:
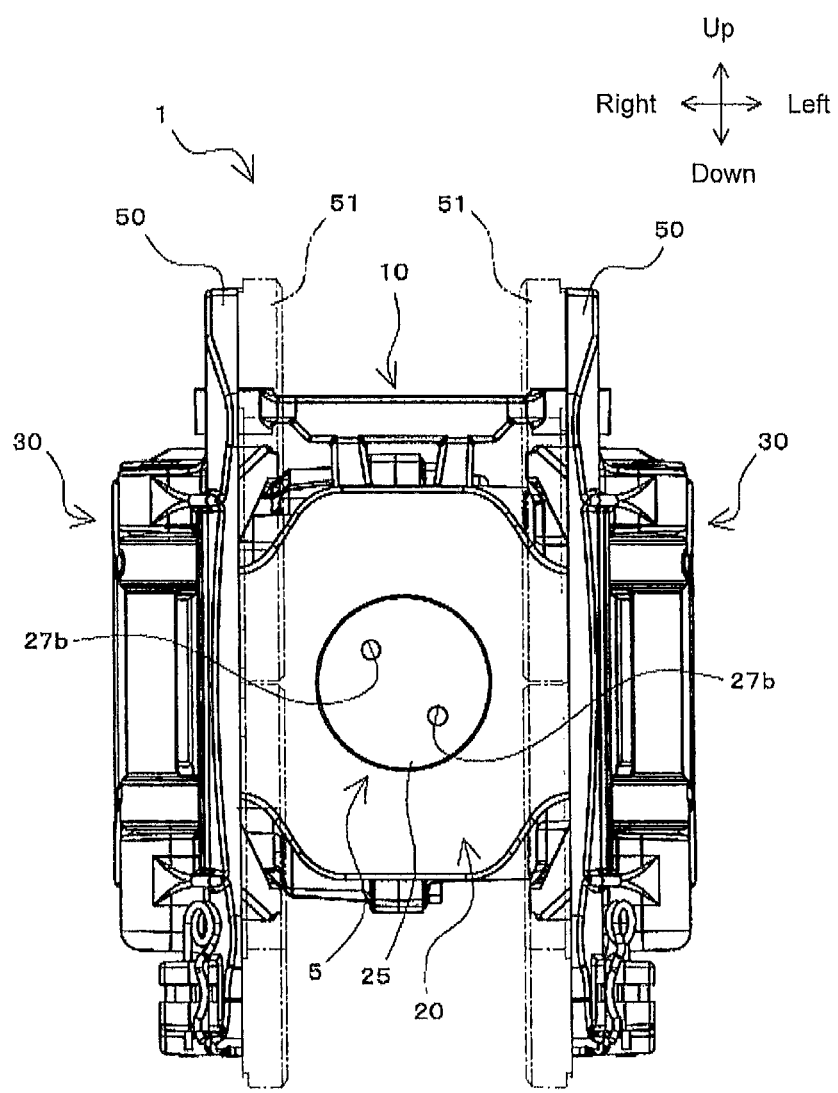
FIG. 3 is a front view showing the disc brake apparatus of FIG. 1.
Figure 4:
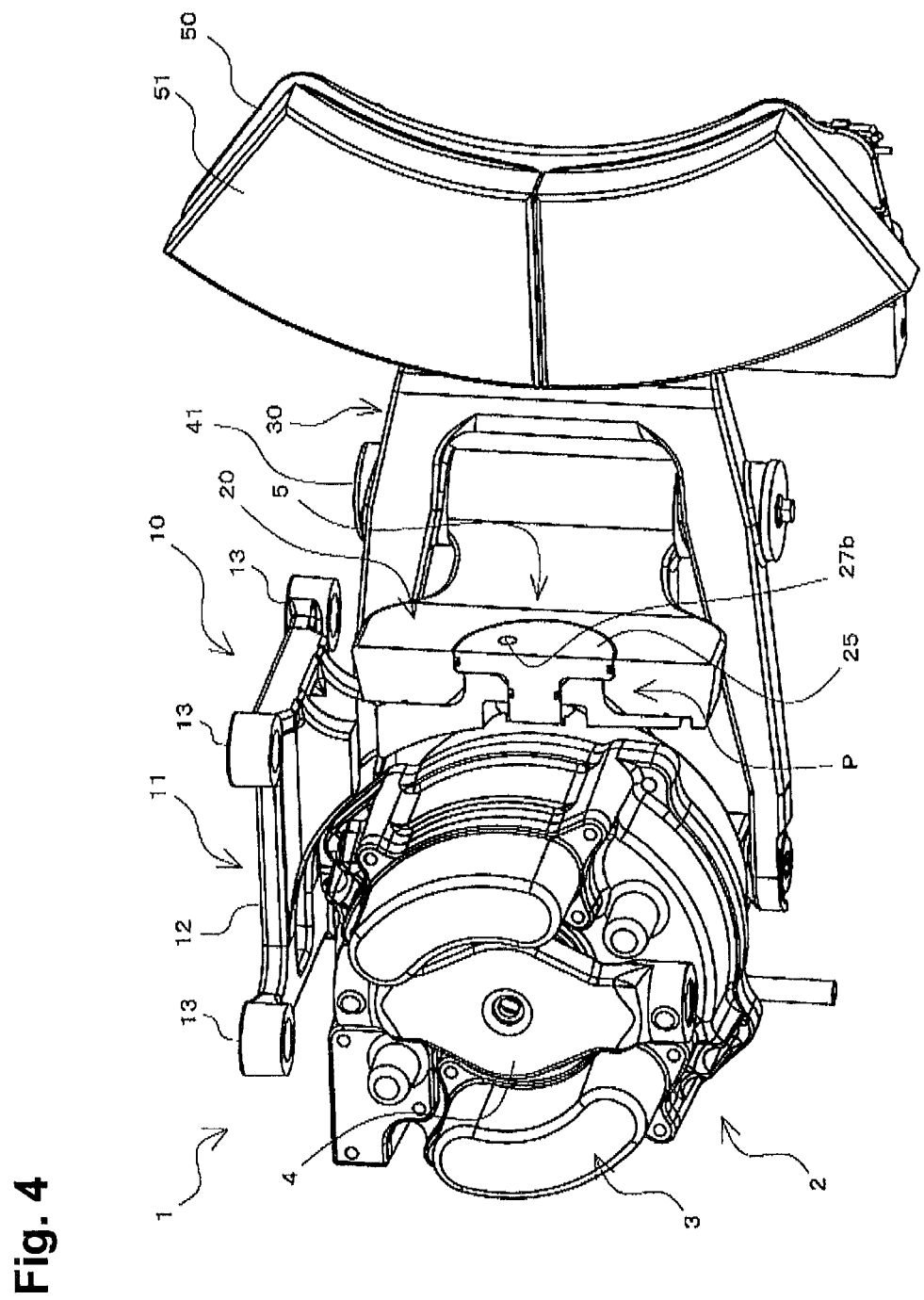
FIG. 4 is a perspective view of the disc brake apparatus of FIG. 1 partially in cross-section with several components excluded from the view.

FIG. 1 is a side view showing the embodiment of a disc brake apparatus 1 according to the present invention. FIG. 2 is an upper view of the disc brake apparatus 1. FIG. 3 shows the disc brake apparatus 1 as viewed from front (a side toward brake disc (not shown)). FIG. 4 is a perspective view of the disc brake apparatus 1 partially in cross-section with several components excluded from the view. In each drawing, for the sake of brevity, the direction indicated by an arrow with "front" is referred to as the front side or frontward, the direction indicated by an arrow with "rear" is referred to as the rear side or rearward, the direction indicated by an arrow with "right" is referred to as the right side, the direction indicated by an arrow with "left" is referred to as the left side, the direction indicated by an arrow with "up" is referred to as the upper side or upward, and the direction indicated by an arrow with "down" is referred to as the lower side or downward. In each drawing, the "front-rear direction" corresponds to a direction extending front to rear in a railway vehicle on which the disc brake apparatus 1 is mounted, the "vertical direction" corresponds to the upper-lower direction (perpendicular direction) of the railway vehicle, and the "lateral direction" corresponds to the vehicle widthwise direction of the railway vehicle, or the axle direction.

As shown in FIGS. 1 to 4, the disc brake apparatus 1 includes a bracket 10, a caliper body 20, two brake levers 30, and a brake cylinder device 2, which are combined together to form the disc brake apparatus 1.

The bracket 10 is a member fixed to a chassis (not shown) located at a lower position of a railway vehicle (not shown and hereafter may be simply described as the vehicle). The bracket 10 extends downward from the chassis.

The caliper body 20 is provided with the brake cylinder device 2. Also, the caliper body 20 is coupled to the bracket 10 and rotational in a vehicle roll rotational direction. As shown in FIG. 4 etc., a coupling position P of the caliper body 20 to the bracket 10 (a position at which the bracket 10 and the caliper body 20 are coupled) is located toward the brake disc from the brake cylinder device 2. Here, the vehicle roll rotational direction refers to a rotational direction in which the direction of the rotational axis (pivotal axis) conforms to the direction (front-rear direction) in which the vehicle travels.

The two brake levers 30 each extend in the front-rear direction. When the lever ratio is one to one, middle portions, in the front-rear direction, of the brake levers 30 are coupled to two laterally opposite ends of the caliper body 20 by two fulcrum pins 41 extending in the vertical direction. The position of the fulcrum pins 41 changes in the front-rear direction depending on the lever ratio. In this manner, each brake lever 30 is supported by the caliper body 20 pivotally about the corresponding fulcrum pin 41, which extends in the vertical direction.

Each brake lever 30 includes an end 31 at one side (rear side, or side of brake lever 30 opposite to brake disc). The brake cylinder device 2 is coupled to the end 31 of each brake lever 30 and configured so that the brake cylinder device 2 drives the end 31 located at one side. Additionally, each brake lever 30 includes another end 32 at another side (front side). Two back plates 50, which hold brake pads 51, are coupled to the ends 32 of the brake levers 30 by back plate support pins 42 so that the back plates 50 are pivotal. In this manner, the brake pads 51 are supported by the back plates 50 on the brake levers 30.

The brake cylinder device 2 includes a cylinder 3 and a rod 4. In the brake cylinder device 2, when compression air is provided to and discharged from the cylinder 3, the rod 4 extends and retracts relative to the cylinder 3. The end 31 of one brake lever 30 is coupled to the cylinder 3 by a cylinder pin 43 so that the brake lever 30 is pivotal. The end 31 of the other brake lever 30 is coupled to the rod 4 by a rod pin 44 so that the brake lever 30 is pivotal. The brake cylinder device 2 may be combined with a cylinder including a spring used when parking the railway vehicle.

General Operation of Disc Brake Apparatus

In the disc brake apparatus 1, which has the structure as described above, when the rod 4 of the brake cylinder device 2 extends from the cylinder 3, the two brake levers 30 are moved about the fulcrum pins 41, which function as fulcrum shafts, to hold the brake disc with the brake pads 51. This applies the brake to rotation of the brake disc and then to rotation of a wheel (not shown) of the railway vehicle arranged coaxial to the brake disc. When the rod 4 retracts toward the cylinder 3, the brake levers 30 are moved about the fulcrum pins 41, which function as the fulcrum shafts, and the brake pads 51 are separated from the brake disc. This cancels the brakes on the wheel.

The brake disc may perform predetermined movement in the vehicle widthwise direction. Thus, in the disc brake apparatus 1, when the brake pads 51 are pressed against the brake disc (braking surfaces), the two brake levers 30 rotate in the vehicle roll rotational direction to follow the movement of the brake disc. Thus, the brake pads 51 may properly planar-contact the brake disc. This ensures generation of the braking force while preventing irregular wear of the brake pads 51.

The disc brake apparatus 1 of the present embodiment includes a roll rotation mechanism 5. The roll rotation mechanism 5 is used for rotating the caliper body 20 and the brake levers 30 relative to the bracket 10 in the vehicle roll rotational direction. The roll rotation mechanism 5 includes a portion of the bracket 10, a portion of the caliper body 20, and a pivot 25. The structure of the bracket 10 and the structure of the caliper body 20 will now be described. Subsequently, the structure of the roll rotation mechanism 5 will be described.

Figure 5A:
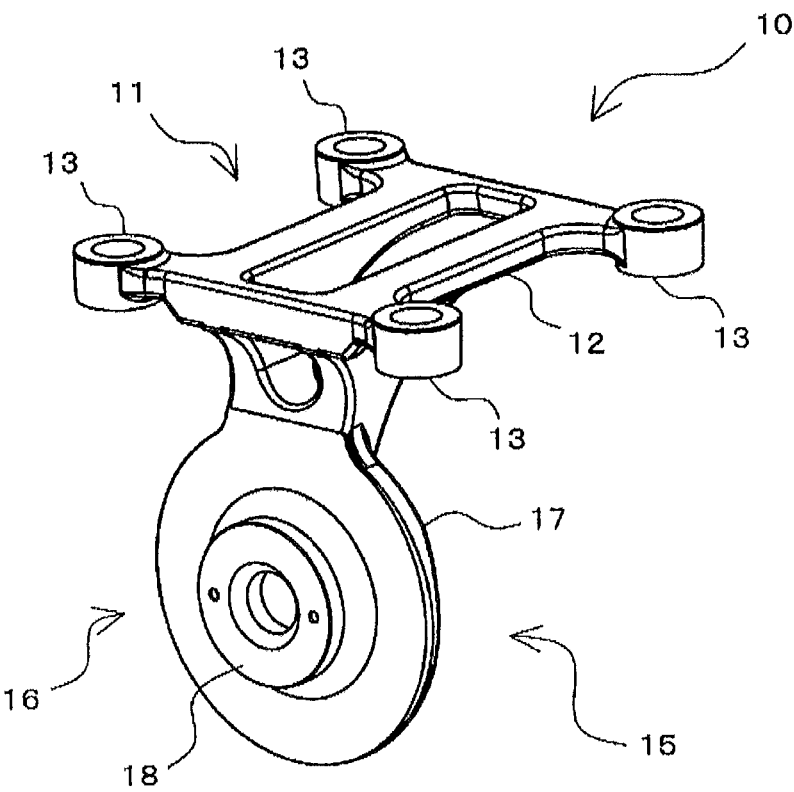
FIGS. 5A and 5B are perspective views of a bracket as viewed from different directions.
Figure 5B:
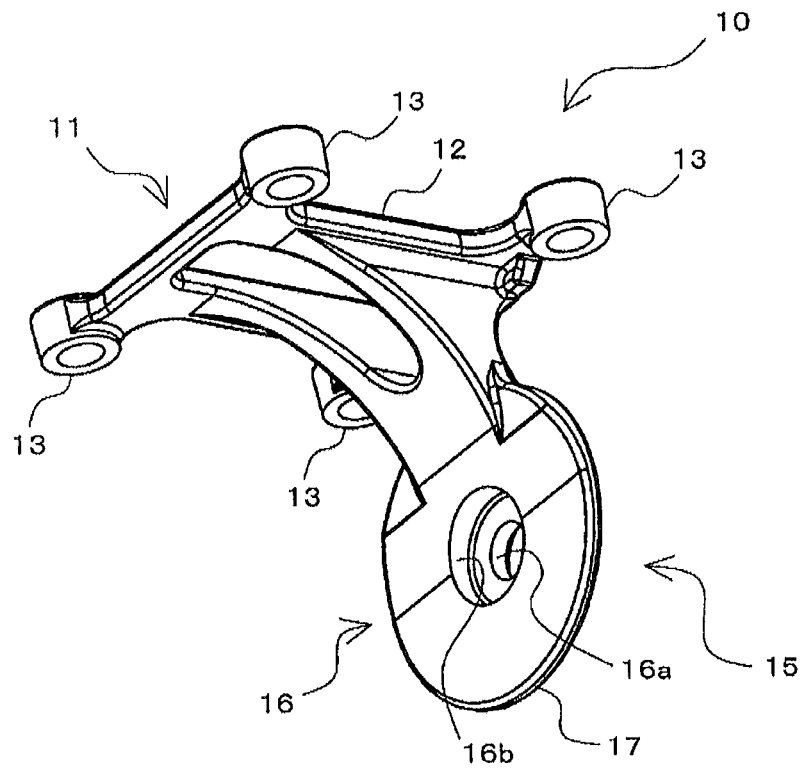
Figure 6A:
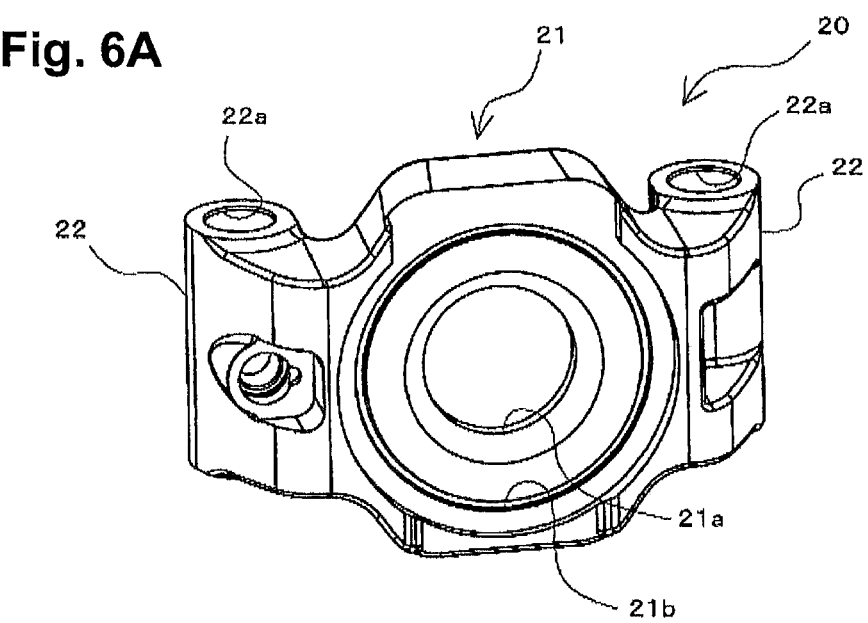
FIGS. 6A and 6B are perspective views of a caliper body as viewed from different directions.
Figure 6B:
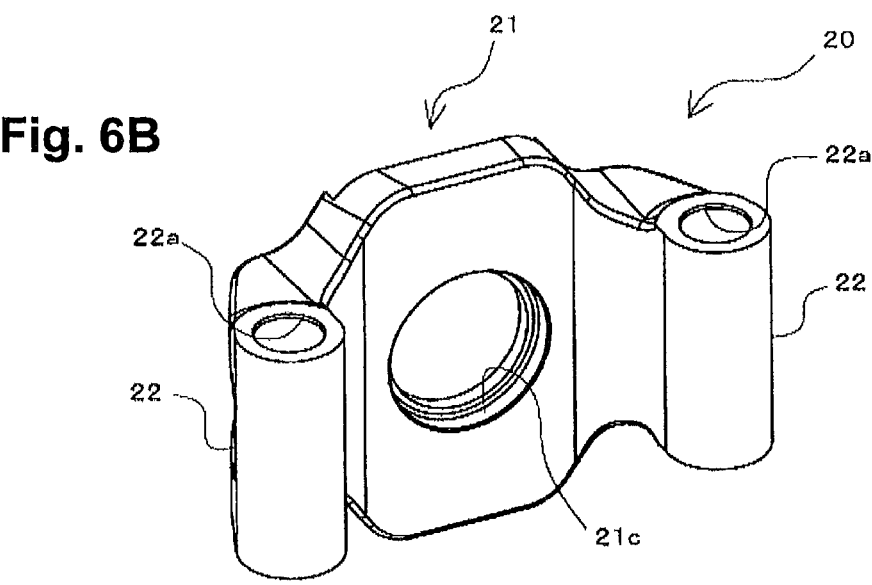
Figure 7A:
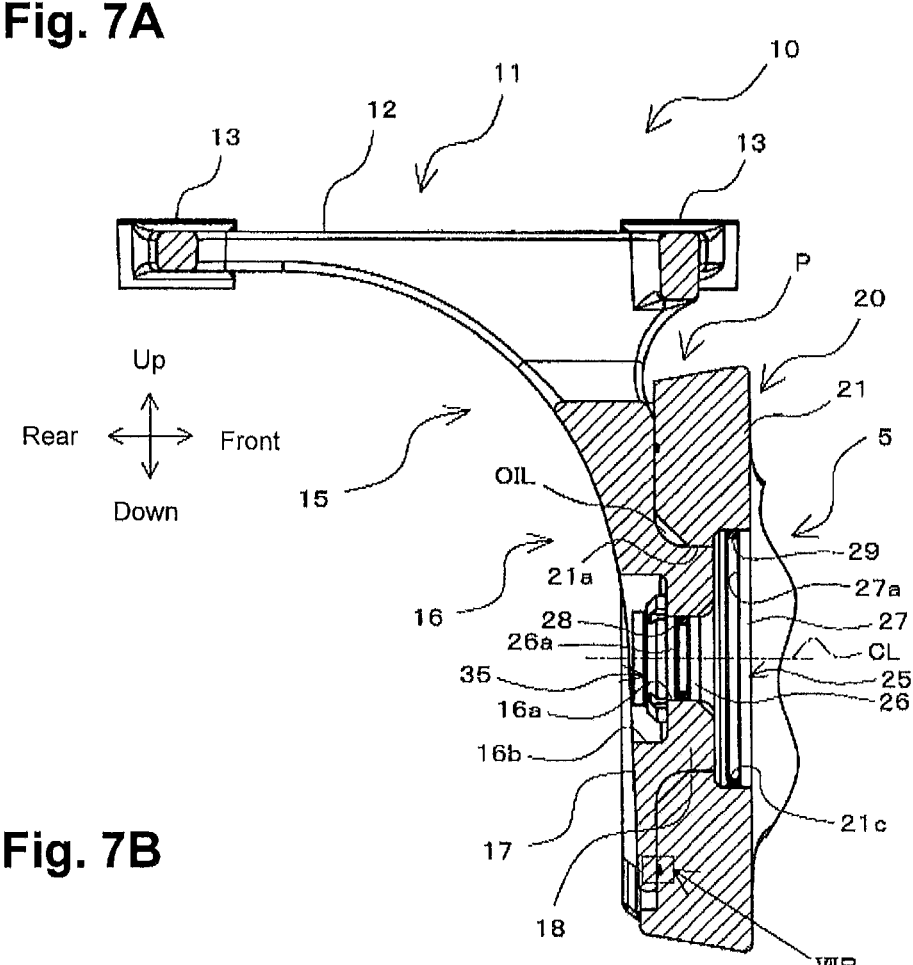
FIG. 7A is a cross-sectional view taken along line VII-VII in FIG. 2 illustrating the structure of a roll rotation mechanism and excluding a brake cylinder device.
Figure 7B:
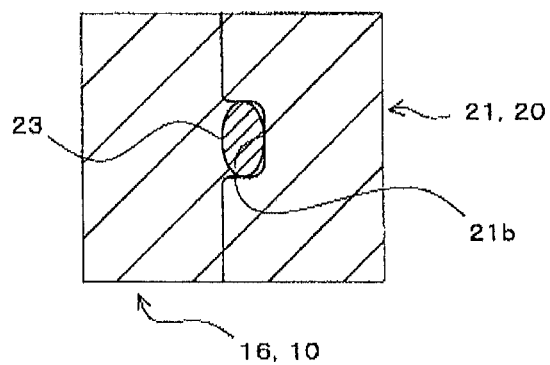
FIG. 7B is an enlarged view showing a portion indicated by VIIB in FIG. 7A.

FIGS. 5A and 5B are perspective views of the bracket 10 as viewed in different directions. FIGS. 6A and 6B are perspective views of the caliper body 20 as viewed in different directions. FIG. 7A is a cross-sectional view taken along line VII-VII in FIG. 2 illustrating the structure of the roll rotation mechanism 5. The brake cylinder device 2 is not shown in FIG. 7A. FIG. 7B is an enlarged view of a portion indicated by VIIB in FIG. 7A.

Bracket Structure

The bracket 10 may include a monolithic member formed from a metal material or the like. As shown in FIGS. 5A, 5B, and 7, the bracket 10 includes a fixing portion 11, which is coupled to the chassis located on a bottom portion of the vehicle, and an extension 15 extending downward from the fixing portion 11. The fixing portion 11 and the extension 15 are integrally formed. Alternatively, the fixing portion 11 and the extension 15 may be separately formed and then integrally joined. The bracket 10 includes an upper surface, which may be referred to as the mount surface.

The fixing portion 11 includes a frame 12, which may be a rectangular frame, and slots 13 respectively formed in four corners of the frame 12. The frame 12 and the slots 13 are integrally formed. The four slots 13 may each include a bolt hole used for fastening the bracket 10 with a bolt to the chassis, which is located on the bottom portion of the vehicle.

The extension 15 extends downward from a front portion of the lower surface of the frame 12. The extension includes a rear portion extending downward from an upper position toward the front so as to form a large arc. The rear portion has a curvature forming the arc described above. This ensures the thickness of the extension 15 in the front-rear direction while preventing interference with the brake cylinder device 2. This also hinders stress concentration on the bracket 10. Consequently, the bracket 10 may have a compact structure. Thus, the disc brake apparatus 1 may entirely have a compact structure. Additionally, the extension 15 includes a distal (lower end) portion, which serves as a holder 16 holding the caliper body 20.

The holder 16 includes a circular plate 17 and a protrusion 18, which are integrally formed. The circular plate 17 extends in a direction orthogonal to the front-rear direction. The protrusion 18 is rod-like and extends frontward from a central portion of the circular plate 17 as viewed in the front-rear direction. The circular plate 17 is concentric with the protrusion 18. The protrusion 18 has a smaller outer diameter than the circular plate 17.

A through hole 16a extends through a central portion of the holder 16 as viewed in the front-rear direction. Additionally, a recess 16b is recessed frontward in a portion of the holder 16 toward the circular plate 17. The recess 16b is circular as viewed from the rear. The recess 16b has a larger inner diameter than the through hole 16a.

Caliper Body Structure

As shown in FIGS. 6 and 7, the caliper body 20 includes a caliper body base 21, which includes a through hole 21a that opens in the front-rear direction, and tubes 22 located in the lateral ends of the caliper body base 21. The caliper body base 21 and the tubes 22 are integrally formed. The caliper body base 21 includes a front surface and a rear surface, each of which is flat.

The through hole 21a extends through a central portion (central portion in the vertical direction and in the lateral direction) of the caliper body base 21 as viewed in the front-rear direction. The inner diameter of the through hole 21a generally conforms to the outer diameter of the protrusion 18 of the holder 16. A through hole 22a extends through each tube 22 in the vertical direction. Each brake lever 30 is coupled by the corresponding fulcrum pin 41 to upper and lower ends of the corresponding tube 22 so that the brake lever 30 is pivotal.

The rear surface of the caliper body base 21 includes an annular groove 21b, which is concentric with the through hole 21a. A ring-like seal member 23 is fitted into the annular groove 21b (refer to FIG. 7B).

A recess 21c is recessed rearward in a front portion of the inner circumferential edge of the caliper body base 21. The recess 21c is circular as viewed from the front. The recess 21c has a larger inner diameter than the through hole 21a. The recess 21c solely or together with the through hole 21a functions as a slot.

Roll Rotation Mechanism Structure

The roll rotation mechanism 5 includes the holder 16 of the bracket 10 (has been described above), the caliper body base 21 (has been described above), and the pivot 25.

The pivot 25 is used for rotating the caliper body 20 relative to the bracket 10. The caliper body 20 is pivotal about a center axis CL of the pivot 25. The center axis CL functions as a pivotal axis. As shown in FIGS. 3, 4, etc., the pivot 25 is located between the two brake levers 30. As viewed in the vehicle widthwise direction, the pivot 25 overlaps with the brake levers 30. More specifically, as viewed in the vehicle widthwise direction, the center of the rod 4 is located on a line extending from the center axis CL of the pivot 25. Here, as viewed in the vehicle widthwise direction, the center of the rod 4 is proximate to the center of gravity of the brake cylinder device 2 in the vertical direction.

Alternatively, as viewed in the vehicle widthwise direction, the vertical position of the center of gravity of the brake cylinder device 2 may be arranged on the extended line of the center axis CL of the pivot 25. Consequently, excessive pivoting of the caliper body 20 may be further easily limited.

Alternatively, the rotational center of the disc brake (not shown) may be located on the extended line of the center axis CL of the pivot 25. This allows each brake pad 51 to have a symmetrical shape at upper and lower sides in conformance with the shape of the brake disc. Thus, braking force that is further well-balanced may be generated.

Referring to FIG. 7, etc., the pivot 25 includes a rod-like shaft 26 and a circular plate 27 arranged concentric with the shaft 26. The shaft 26 and the circular plate 27 are integrally formed. Instead, the shaft 26 and the circular plate 27 may be separately formed and then integrally joined. The circular plate 27 includes a circumferential surface, or a curved side surface. The circular plate 27 is an example of a rod-like portion. The circular plate 27 may be referred to as the head of the pivot 25.

The shaft 26 is rod-like and extends in the front-rear direction. The shaft 26 includes an outer diameter that generally conforms to the through hole 16a formed in the holder 16 of the bracket 10. An annular groove 26a is formed in a circumferential surface of the shaft 26. A ring-like seal member 28 is fitted into the groove 26a.

The circular plate 27 is disc-like and thinner than the shaft 26 in the front-rear direction. The circular plate 27 includes an outer diameter that generally conforms to the inner diameter of the recess 21c formed in the caliper body base 21. An annular groove 27a is formed in a circumferential surface of the circular plate 27. A ring-like seal member 29 is fitted into the groove 27a.

The holder 16, the caliper body base 21, and the pivot 25 are combined together to form the roll rotation mechanism 5. More specifically, as shown in FIG. 7, in the roll rotation mechanism 5, the protrusion 18 of the holder 16 is inserted into the through hole 21a formed in the caliper body base 21. Under this condition, the shaft 26 of the pivot 25 is inserted into the through hole 16a of the holder 16, and the circular plate 27 is inserted into the recess 21c of the caliper body base 21.

Rotation of the pivot 25 relative to the holder 16 is restricted by a nut-like shaft stopper 35 engaged with an end of the pivot 25 located toward the shaft 26. More specifically, the shaft stopper 35, which includes a female-threaded inner wall, is engaged with a male-threaded rear portion of the shaft 26. Consequently, the protrusion 18 is held between the circular plate 27 and the shaft stopper 35. Thus, the pivot 25 is fixed to the holder 16 and incapable of rotating relative to the holder 16. When the shaft stopper 35 is engaged with the shaft 26 in the above manner, rotation of the circular plate 27 may be restricted by inserting a rod-like tool (hex key or the like) into a slot 27b formed in a front surface of the circular plate 27. This allows the shaft stopper 35 to be fixed to the shaft 26 with an appropriate torque.

The caliper body 20 is pivotal relative to the pivot 25 and the holder 16 in a slidable manner. More specifically, in the caliper body 20, the wall surface of the recess 21c slides and rotates relative to the circumferential surface of the circular plate 27 of the pivot 25 with the seal member 29 included in between, and simultaneously, the wall surface of the through hole 21a slides and rotates relative to the circumferential surface of the protrusion 18 of the holder 16. Under this situation, the rear surface of the caliper body base 21 slides and rotates relative to the front surface of the circular plate 17 of the holder 16.

Additionally, the roll rotation mechanism 5 includes slide portions, which are located between the caliper body base 21 and the holder 16 and between the caliper body base 21 and the pivot 25. The slide portions are lubricated by a lubricant such as lubrication grease or lubrication oil OIL.

More specifically, in the roll rotation mechanism 5, the lubrication grease or lubrication oil OIL is included in a gap formed by the seal members 23, 29 and the slide portions. This ensures the lubrication of the slide portions in the roll rotation mechanism 5 while reducing the maintenance task such as that for periodically adding the lubrication grease or lubrication oil OIL.

Roll Rotation Mechanism Operation

In the disc brake apparatus 1, when the brake pads 51 are pressed against the brake disc (braking surfaces) that moves by a predetermined width in the vehicle widthwise direction while rotating, the roll rotation mechanism 5 operates as follows. More specifically, when the wheel and the brake disc, which are rotating, move in the roll rotational direction, the roll rotation mechanism 5 accordingly rotates the brake levers 30, which hold the brake disc in between, in the roll rotational direction (direction of rotation about an axis extending in the vehicle front-rear direction). In this case, the caliper body base 21 rotates relative to the pivot 25 and the holder 16 of the bracket 10 with the lubrication grease or lubrication oil OIL included in between. This rotates the caliper body 20. Consequently, the two brake levers 30 rotate in the roll rotational direction to follow the movement of the brake disc in the vehicle widthwise direction. Thus, the brake pads 51 may properly planar-contact the brake disc. This prevents a situation in which a certain portion of a brake pad 51 extremely wears, that is, irregular wear, while allowing for generation of sufficient braking force.

Advantages

As described above, in the disc brake apparatus 1 of the embodiment, the coupling position P of the caliper body 20 to the bracket 10 is located toward the brake disc from the brake cylinder device 2. Thus, the brake cylinder device 2 may be located close to a vehicle floor as compared to a conventional structure (structure in which the pivotal axis is located at a position higher than the brake cylinder device). More specifically, the coupling position P may be set so that the coupling position P of the caliper body 20 to the bracket 10 overlaps with the brake cylinder device 2 as viewed in the vehicle front-rear direction. This prevents or minimizes increases in the height (size in vertical direction) of a disc brake apparatus. The bracket 10 includes a coupling surface, to which the caliper body 20 is coupled. The coupling surface is, for example, the front surface of the circular plate 17. At least a portion of the coupling surface overlaps with the brake cylinder device 2 in the heightwise direction. Preferably, half of the coupling surface, or further preferably, the entire coupling surface, overlaps with the brake cylinder device 2 in the heightwise direction.

Therefore, even when the brake cylinder device 2 has a large bore diameter, increases in the height of the disc brake apparatus 1 may be prevented or minimized.

Additionally, in the disc brake apparatus 1, there is no need to change a coupling position of the disc brake apparatus 1 to a vehicle body in relation to the position of the brake disc of the vehicle. Thus, even when a brake cylinder device that is currently mounted on the disc brake apparatus is replaced by another brake cylinder device having a different bore diameter, the positional relationship with the brake disc remains the same. This allows for easy application to future specification changes.

Additionally, in the disc brake apparatus 1, as viewed in the vehicle widthwise direction, the center axis CL of the pivot 25 would not project from above the brake levers 30. This ensures that the disc brake apparatus 1 is reduced in height.

In the prior art, the center axis of the pivot is separated upward from the center of gravity of the brake cylinder device. More specifically, in the prior art, the center of gravity of the brake cylinder device, which is relatively heavy, is separated downward from the center axis of the pivot. Thus, the caliper body excessively pivots when the vehicle laterally sways. In this regard, in the disc brake apparatus 1, the center axis CL of the pivot 25 would not be greatly separated from the center of gravity of the brake cylinder device 2. This limits excessive pivoting of the caliper body 20.

The disc brake apparatus 1 eliminates the need for a pin that is long in the front-rear direction and conventionally used to pivot the caliper body relative to the bracket. Thus, the device may have a simple structure.

In the disc brake apparatus 1, the circular plate 27 allows the caliper body 20 to appropriately slide relative to the bracket 10.

In the disc brake apparatus 1, a lubricant such as grease or oil may decrease wear of the slide portion that is located between the pivot 25 and one of the bracket 10 and the caliper body 20. Further, the lubricant is included in a gap formed by the seal members 23, 29 and the slide portions. This reduces the maintenance task such as that for periodically adding the lubricant to the gap.

In the disc brake apparatus 1, the brake cylinder device 2 may be located proximate to the bracket 10. Thus, the disc brake apparatus 1 may have a compact structure.

It should be apparent to those skilled in the art that the present invention may be embodied in many other specific forms without departing from the scope of the invention. Particularly, it should be understood that the present invention may be embodied in the following forms.

(1) In the above embodiment, the roll rotation mechanism 5 is configured to rotate the caliper body 20 relative to the holder 16 of the bracket 10 and the pivot 25. Instead, the roll rotation mechanism 5 may be configured to rotate a pivot and a caliper body relative to a holder of a bracket.

(2) In the above embodiment, the pivot 25 is arranged so that a direction extended from the center axis CL of the pivot 25 overlaps with the center of the rod 4 as viewed in the vehicle widthwise direction. Here, as viewed in the vehicle widthwise direction, the center of the rod 4 is proximate to the vertical position of the center of gravity of the brake cylinder device 2. Instead, the pivot 25 may be located in any position as long as the coupling position P of the bracket 10 and the caliper body 20 is located toward the brake disc from the brake cylinder device 2.

(3) In the above embodiment, the caliper body 20 is arranged to slide relative to the bracket 10. Instead, the caliper body 20 may be configured not to slide relative to the bracket 10. More specifically, instead of directly sliding relative to the bracket 10, the caliper body 20 may be rotationally arranged relative to the bracket 10 having another member, for example, a bearing or a plain bearing, located in between.

(4) In the above embodiment, the pivot 25 is configured to include the circular plate 27. However, the pivot 25 may have any shape as long as the caliper body 20 is pivotal relative to the bracket 10.

(5) The above embodiment is configured so that the lubrication grease or lubrication oil OIL reduces friction force between the caliper body 20 and the bracket 10 and between the caliper body 20 and the pivot 25. Instead, the friction force may be reduced, for example, by providing a bearing or the like.

Figure 8:
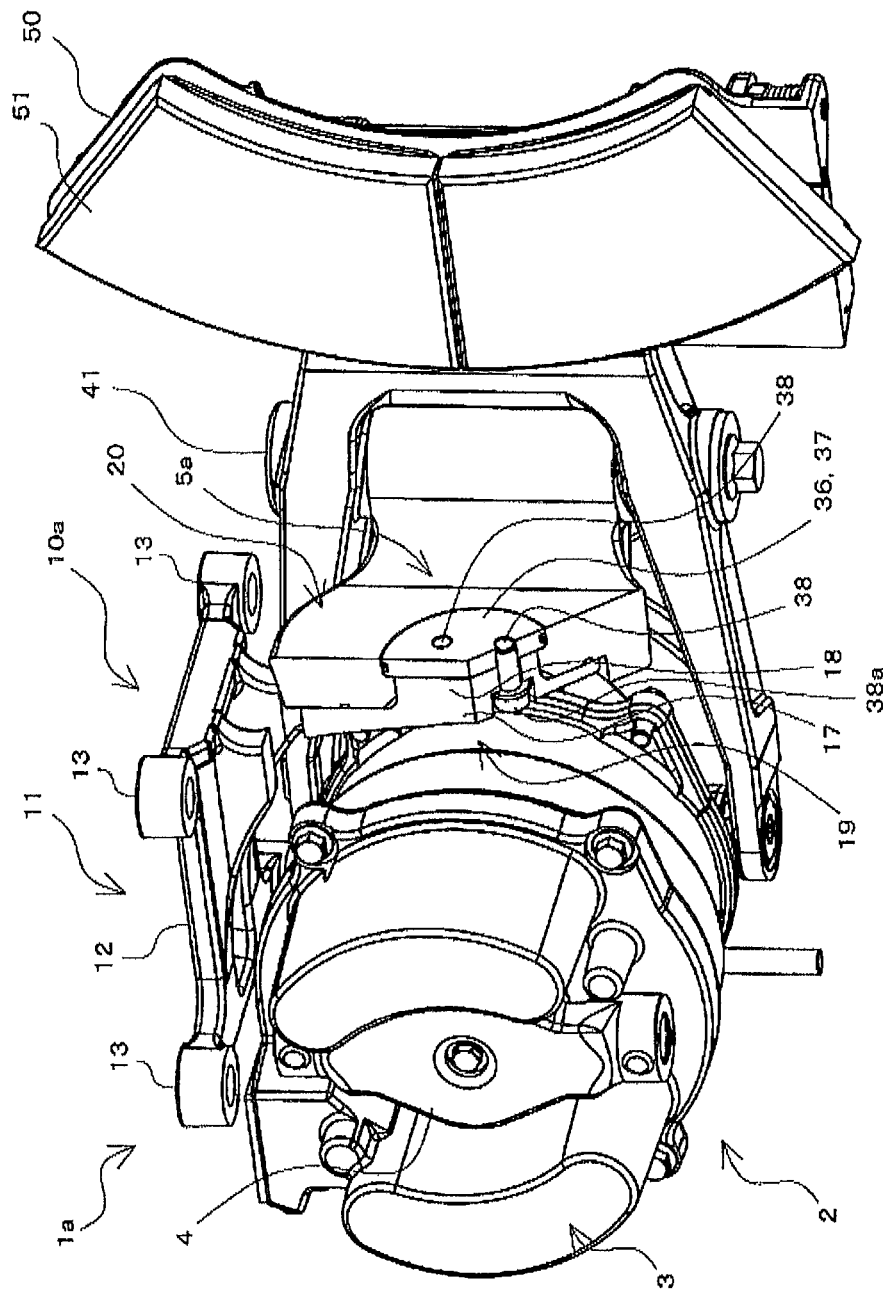
FIG. 8 is a perspective view of a modified example of a disc brake apparatus partially in cross-section with several components excluded from the view.

(6) FIG. 8 is a perspective view of a modified example of a disc brake apparatus 1a partially in cross-section with several components excluded from the view. The disc brake apparatus 1a of the modified example differs from the above embodiment in the structure of the roll rotation mechanism. More specifically, a roll rotation mechanism 5a of the modified example differs from the roll rotation mechanism 5 of the above embodiment in the structures of the holder of the bracket and the pivot. The description will now focus on the differences from the above embodiment. Other points will not be described.

In the same manner as the holder 16 of the above embodiment, a bracket 10a of the modified example includes a holder 19 including a circular plate 17 and a protrusion 18, which are integrally formed. However, the holder 19 differs from the holder 16 of the above embodiment in that the holder 19 does not include the through hole 16a and the recess 16b. Additionally, a pivot 36 of the modified example includes a disc-like circular plate 37. The circular plate 37 has the same shape as the circular plate 27 of the pivot 25 of the above embodiment. The circular plate 37 includes a circumferential surface, or a curved side surface. The circular plate 37 is an example of a rod-like portion.

As shown in FIG. 8, in the roll rotation mechanism 5a of the modified example, two bolts 38 are inserted in the front-rear direction into the holder 19 and the pivot 36, which are in close contact with each other in the front-rear direction. The holder 19 and the pivot 36 are fixed to each other with the bolts 38.

In the same manner as the above embodiment, the caliper body 20 rotates relative to the holder 19 and the pivot 36, which are fixed to each other as described above. More specifically, when the roll rotation mechanism includes the roll rotation mechanism 5a of the modified example, the brake levers 30 may be appropriately rotated in the roll rotational direction in the same manner as the above embodiment.

In the modified example, the bracket and the pivot may have a simple shape as compared to the above embodiment. Additionally, components such as the shaft stopper 35 may be omitted from the modified example. Thus, the roll rotation mechanism may have a simple structure.

As shown in FIG. 8, in the modified example, the holder 19 and the pivot 36 are fastened by the bolts 38 each having a bolt head 38a. Instead, the holder 19 and the pivot 36 may be fastened by bolts having no bolt head (i.e., bolt only including a rod-like portion having a threaded circumference).

The above description is intended to be illustrative, and not restrictive. For example, the above-described examples (or one or more aspects thereof) may be used in combination with each other. Other embodiments can be used, such as by one of ordinary skill in the art upon reviewing the above description. Also, in the above detailed description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the detailed description, with each claim standing on its own as a separate embodiment. The scope of the invention should be determined with reference to the appended claims, along with the full scope of equivalents to which such claims are entitled.

The invention claimed is:

1. A vehicle disc brake apparatus adapted for use with a vehicle including a brake disc, the vehicle disc brake apparatus comprising:
 a bracket configured to be fixed to the vehicle;
 a caliper body coupled to the bracket;
 a brake cylinder device that generates braking force; and
 two levers arranged on the caliper body, wherein the levers transmit the braking force to the brake disc of the vehicle,
 wherein the bracket and the caliper body are coupled at a position located toward the brake disc from the brake cylinder device,
 wherein a through hole is formed in the caliper body and the through hole opens in a front-rear direction of the vehicle,
 wherein the bracket includes
   a circular plate that extends in a direction orthogonal to the front-rear direction of the vehicle, and
   a protrusion that extends frontward from a central portion of the circular plate of the bracket as viewed in the front-rear direction of the vehicle, the protrusion being concentric with the circular plate of the bracket, and
 wherein the protrusion of the bracket is inserted into the through hole of the caliper body such that the caliper body is pivotable relative to the bracket and the vehicle about a pivotal connection that includes a rod portion having a pivotal axis extending in the front-rear direction of the vehicle and is a sole pivotal connection, extending in the front-rear direction of the vehicle, in the vehicle disc brake apparatus,
 wherein the protrusion of the bracket is inserted into the through hole of the caliper body such that the caliper body makes slidable surface contact with the circular plate and the protrusion of the bracket;
 wherein the protrusion of the bracket is provided with a through hole that extends through a central portion of the protrusion of the bracket; and
 wherein the rod portion of the pivotal connection is inserted in the through hole of the protrusion of the bracket, and an outer peripheral surface of the rod portion is surrounded by and comes in contact with an inner peripheral surface of the through hole of the protrusion of the bracket.

2. The vehicle disc brake apparatus according to claim 1, wherein the pivotal axis is arranged to overlap with the two levers as viewed in a widthwise direction of the vehicle.

3. The vehicle disc brake apparatus according to claim 1, wherein the pivotal axis is configured so that as viewed in the vehicle widthwise direction, a center of gravity of the brake cylinder device in a vertical direction is located on a line that extends along the pivotal axis.

4. The vehicle disc brake apparatus according to claim 1, wherein the caliper body is coupled so that the caliper body slides relative to the bracket.

5. The vehicle disc brake apparatus according to claim 1, wherein the pivotal connection has a center axis that conforms to the pivotal axis,
 wherein the pivotal connection is fixed to one of the bracket and the caliper body,
 wherein the other of the bracket and the caliper body includes a slot, wherein the rod portion is inserted into the slot, and wherein the rod portion slides and rotates relative to the slot.

6. The vehicle disc brake apparatus according to claim 5, further comprising:
 a plurality of seal members arranged on a slide portion, wherein the slide portion is located between the pivotal connection and a sliding part of one of the bracket and the caliper body, and wherein the sliding part slides relative to the pivotal connection; and
 a lubricant included in a gap formed by the seal members and the slide portion.

7. The vehicle disc brake apparatus according to claim 1, wherein the bracket includes a fixing portion coupled to the vehicle, and an extension including a basal portion fixed to the fixing portion,
 wherein the extension extends away from the vehicle, and wherein the extension includes a curved portion located toward the brake cylinder device.

8. The vehicle disc brake apparatus according to claim 5, wherein the slot and the rod portion are located at the same height as the brake cylinder device.

9. The vehicle disc brake apparatus according to claim 1, wherein as viewed in a direction of the pivotal axis, the pivotal axis is located between the two levers at the same height as a portion of the brake cylinder device.

10. A vehicle disc brake apparatus adapted for use with a brake disc including a braking surface, the vehicle disc brake apparatus comprising:
 a bracket including a mount surface that is orthogonal to the braking surface;
 a pivotal caliper body coupled to the bracket; and
 a brake cylinder device coupled to two levers arranged on the caliper body, wherein the brake cylinder device and the levers cooperate to generate and transmit a braking force to the brake disc,
 wherein a through hole is formed in the caliper body and the through hole opens in a front-rear direction of the vehicle,
 wherein the bracket includes
   a circular plate that extends in a direction orthogonal to a front-rear direction of the vehicle, and
   a protrusion that extends frontward from a central portion of the circular plate of the bracket as viewed in the front-rear direction, the protrusion being concentric with a circular plate of the bracket,
 wherein the protrusion of the bracket is inserted into the through hole of the caliper body such that the caliper body is pivotal relative to the bracket and the vehicle about a pivotal connection that includes a rod portion having a pivotal axis extending in a front-rear direction of the vehicle and is parallel to the braking surface,
 wherein the pivotal connection is a sole pivotal connection, extending in the front-rear direction of the vehicle, in the vehicle disc brake apparatus,
 wherein the pivotal axis is located at the same height as a portion of the brake cylinder device, and wherein the protrusion of the bracket is inserted into the through hole of the caliper body such that the caliper body makes slidable surface contact with the circular plate and the protrusion of the bracket;

wherein the protrusion of the bracket is provided with a through hole that extends through a central portion of the protrusion of the bracket; and wherein the rod portion of the pivotal connection is inserted in the through hole of the protrusion of the bracket, and an outer peripheral surface of the rod portion is surrounded by and comes in contact with an inner peripheral surface of the through hole of the protrusion of the bracket.

11. The vehicle disc brake apparatus according to claim 10, wherein as viewed in a direction of the pivotal axis, the pivotal axis is located between the two levers.

12. The vehicle disc brake apparatus according to claim 10, wherein the pivotal connection operably connects the bracket and the caliper body, wherein the pivotal connection is located at a height between the mount surface and a lower end of the brake cylinder device, and wherein the pivotal connection has a center axis that conforms to the pivotal axis.

13. The vehicle disc brake apparatus according to claim 1, wherein the circular plate includes the central portion and a surrounding peripheral portion, and wherein the surrounding peripheral portion of the circular plate of the bracket includes a front surface that faces a rear surface of the caliper body when the protrusion of the bracket is inserted into the through hole of the caliper body.

14. The vehicle disc brake apparatus according to claim 13, wherein the caliper body is pivotable relative to the pivotal connection and the bracket in a slidable manner such that, when the protrusion of the bracket is inserted into the through hole of the caliper body and when the disc brake apparatus is operated, a surface of the through hole of the caliper body slides and rotates relative to a circumferential surface of the protrusion of the bracket and the rear surface of the caliper body slides and rotates relative to the front surface of the circular plate of the bracket.

15. The vehicle disc brake apparatus according to claim 1, wherein the pivotal connection is fixed to the bracket such that the pivotal connection does not rotate relative to the bracket.

16. The vehicle disc brake apparatus according to claim 10, wherein the circular plate includes the central portion and a surrounding peripheral portion, and wherein the surrounding peripheral portion of the circular plate of the bracket includes a front surface that faces a rear surface of the caliper body when the protrusion of the bracket is inserted into the through hole of the caliper body.

17. The vehicle disc brake apparatus according to claim 16, wherein the caliper body is pivotable relative to the pivotal connection and the bracket in a slidable manner such that, when the protrusion of the bracket is inserted into the through hole of the caliper body and when the disc brake apparatus is operated, a surface of the through hole of the caliper body slides and rotates relative to a circumferential surface of the protrusion of the bracket and the rear surface of the caliper body slides and rotates relative to the front surface of the circular plate of the bracket.

18. The vehicle disc brake apparatus according to claim 10, wherein the pivotal connection is fixed to the bracket such that the pivotal connection does not rotate relative to the bracket.

* * * * *